Nov. 13, 1928.
G. W. SILBAUGH
NUT
1,691,829
Original Filed June 19, 1926
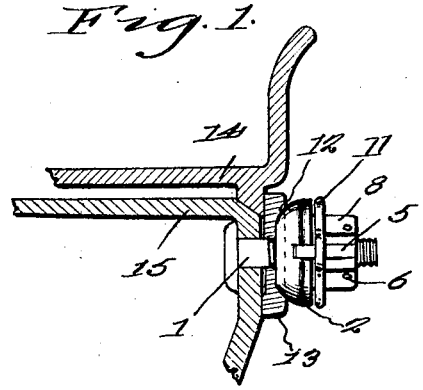
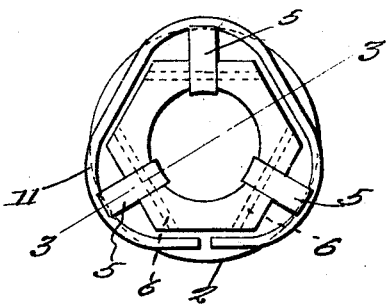
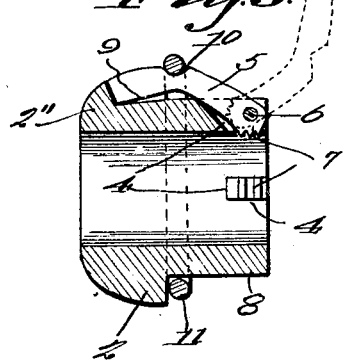
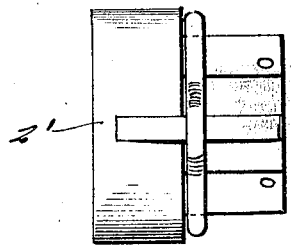
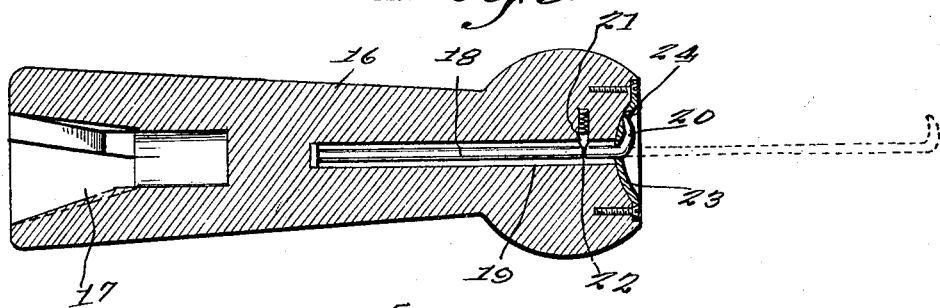
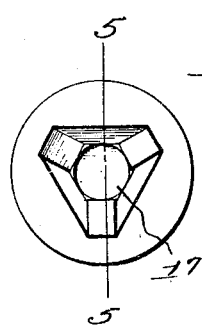
G. W. Silbaugh, INVENTOR
BY Victor J. Evans
ATTORNEY
WITNESS:
R. A. Thomas Patented Nov. 13, 1928.

1,691,829

UNITED STATES PATENT OFFICE.

GEORGE W. SILBAUGH, OF CHARLEROI, PENNSYLVANIA.

NUT.

Application filed June 19, 1926, Serial No. 117,209. Renewed July 9, 1928.

This invention relates to means for attaching a member to a bolt or the like, the general object of the invention to make the member with a smooth bore instead of a threaded one so that it can be easily placed on a bolt which may also be made without threads and to provide levers which are pivoted to the member and which are provided with teeth which will dig into the bolt when the levers are swung against the member and thus hold the member on the bolt.

A further object of the invention is to provide a split ring for holding the levers in closed position.

Another object of the invention is to provide a tool for facilitating the manipulation of the levers.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a sectional view showing the invention in use for holding a rim on a wheel.

Figure 2 is a view of the improved nut or member.

Figure 3 is a section on line 3—3 of Figure 2.

Figure 4 is an elevation showing a modification.

Figure 5 is a section on line 5—5 of Figure 6.

Figure 6 is an end view of the tool shown in Figure 5.

In these views, 1 indicates the bolt and 2 the nut or member which is to be placed on the bolt. This member is provided with a plain bore to receive the bolt and if desired the bolt need not be provided with threads. Notches 4 are formed in the outer end of the member 2 and a lever 5 is pivoted in each notch by the pin 6 which passes through the notch and through the lever. Each lever is provided with a cam part 7 which is provided with teeth or serrations and the parts are so arranged that when the lever is in closed position, the toothed part will extend into the bore 3 and thus grip the bolt so as to hold the member on the bolt. It will be seen that as the levers are pushed downwardly into closed position, the toothed parts, engaging the bolt, will tend to move the nut toward the head of the bolt at the same time the toothed parts are gripping the bolt so that the nut will be moved tightly against the object being held.

I prefer to form the nut with a reduced outer part 8 which is of hexagonal shape and to form notches 9 in the large part, these notches receiving the free ends of the levers when the levers are in closed position. Each lever is of slightly curved shape, as shown in Figure 3, so that its central part will be spaced from the nut and each lever is provided with a recess 10 at its outer edge so that a split ring 11 may be forced over the levers into the recesses to hold the levers in closed position, as shown in Figures 2 and 3.

Figure 4 shows a nut member 2' which is of slightly different shape from that shown in Figures 1, 2 and 3, in that the large part of the nut is of cylindrical shape with a flat face, whereas the nut shown in Figures 1, 2 and 3 has its inner face rounded, as at 2'' so as to engage a recess 12 in the ring 13 or other member which is held in place by the nuts and bolts. Figure 1 shows this ring 13 as being the ring which holds a rim 14 on a disk wheel 15.

Figures 5 and 6 show a tool for opening and closing the levers. This tool comprises a body 16 which has a socket 17 in one end thereof, the outer part of which is of hexagonal shape and is also of tapered shape so that it will fit over the hexagonal part of the nut and move the levers to closed position. This tool will also force the split ring on the levers. A rod 18 is slidably mounted in a hole 19 formed in the other end of the tool, said rod having a hooked end 20 which can be used for pulling the ring off the levers and for opening the levers. A spring plunger 21 is arranged in the body of the tool and engages a groove 22 in the rod 18 for holding the rod in the opening 19. A cup-shaped disk 23 is sunk in the head of the tool and has a hole therein through which the rod 18 extends. The hook-shaped part of the rod occupies the recess formed by this disk so that it will not project from the head of the tool when in inoperative position. A small opening 24 is made in the disk to receive the extremity of the hooked part of the rod.

By this invention, a nut can be simply slid over the end of a bolt and then the levers pushed inwardly to clamp the nut to the bolt and also to tighten the nut against the object being held. The split ring will then hold the levers in closed position. The tool forms a ready means for removing the ring and for opening and closing the levers and replacing the ring.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A nut member having notches in the outer end thereof, a lever pivoted in each notch and having a cam part which is toothed and which will extend within the bore of the nut when the lever is in closed position and a split ring for holding the levers in closed position.

2. A nut member having notches in the outer end thereof, a lever pivoted in each notch and having a cam part which is toothed and which will extend within the bore of the nut when the lever is in closed position and means for holding the levers in closed position.

In testimony whereof I affix my signature.

GEORGE W. SILBAUGH.